United States Patent [19]
Fortini

[11] 3,910,039
[45] Oct. 7, 1975

[54] ROCKET CHAMBER AND METHOD OF MAKING

[75] Inventor: Anthony Fortini, Cleveland, Ohio

[73] Assignee: The United States of America as represented by the United States National Aeronautics and Space Administration, Washington, D.C.

[22] Filed: Jan. 24, 1974

[21] Appl. No.: 436,316

Related U.S. Application Data

[62] Division of Ser. No. 289,050, Sept. 14, 1972, Pat. No. 3,832,920.

[52] U.S. Cl. .................. 60/265; 60/267; 239/127.3
[51] Int. Cl.² ..................... F02K 9/02; F02K 11/02
[58] Field of Search ..... 60/265, 267, 39.66, DIG. 8; 239/127.1, 127.3

[56] References Cited
UNITED STATES PATENTS

| | | | |
|---|---|---|---|
| 2,183,313 | 12/1939 | Goddard | 60/265 X |
| 2,518,881 | 8/1950 | Goddard | 60/265 X |
| 2,941,759 | 6/1960 | Rice et al. | 60/39.66 |
| 2,975,590 | 3/1961 | Vonder Esch | 60/39.66 X |
| 3,067,982 | 12/1962 | Wheeler | 416/231 |
| 3,069,847 | 12/1962 | Vest | 60/265 |
| 3,349,558 | 10/1967 | Smith | 60/39.66 X |
| 3,613,778 | 10/1971 | Feldman | 165/105 |
| 3,656,863 | 4/1972 | De Feo | 416/231 |
| 3,692,637 | 9/1972 | Dederra et al. | 60/267 X |

OTHER PUBLICATIONS

Barrere et al., "Rocket Propulsion", Elsevier Pub. Co., London, 1960; p. 462.

*Primary Examiner*—C. J. Husar
*Assistant Examiner*—Robert E. Garrett
*Attorney, Agent, or Firm*—N. T. Musial; J. A. Mackin; John R. Manning

[57] ABSTRACT

A transpiration cooled rocket chamber is made by forming a porous metal wall on a suitably shaped mandrel. The porous wall may be made of sintered powdered metal, metal fibers sintered on the mandrel or wires woven onto the mandrel and then sintered to bond the interfaces of the wires. Intersecting annular and longitudinal ribs are then electroformed on the porous wall. An interchamber wall having orifices therein is then electroformed over the annular and longitudinal ribs. Parallel longitudinal ribs are then formed on the outside surface of the interchamber wall after which an annular jacket is electroformed over the parallel ribs to form distribution passages therewith. A feed manifold communicating with the distribution passages may be fabricated and welded to the rocket chamber or the feed manifold may be electroformed in place.

1 Claim, 2 Drawing Figures

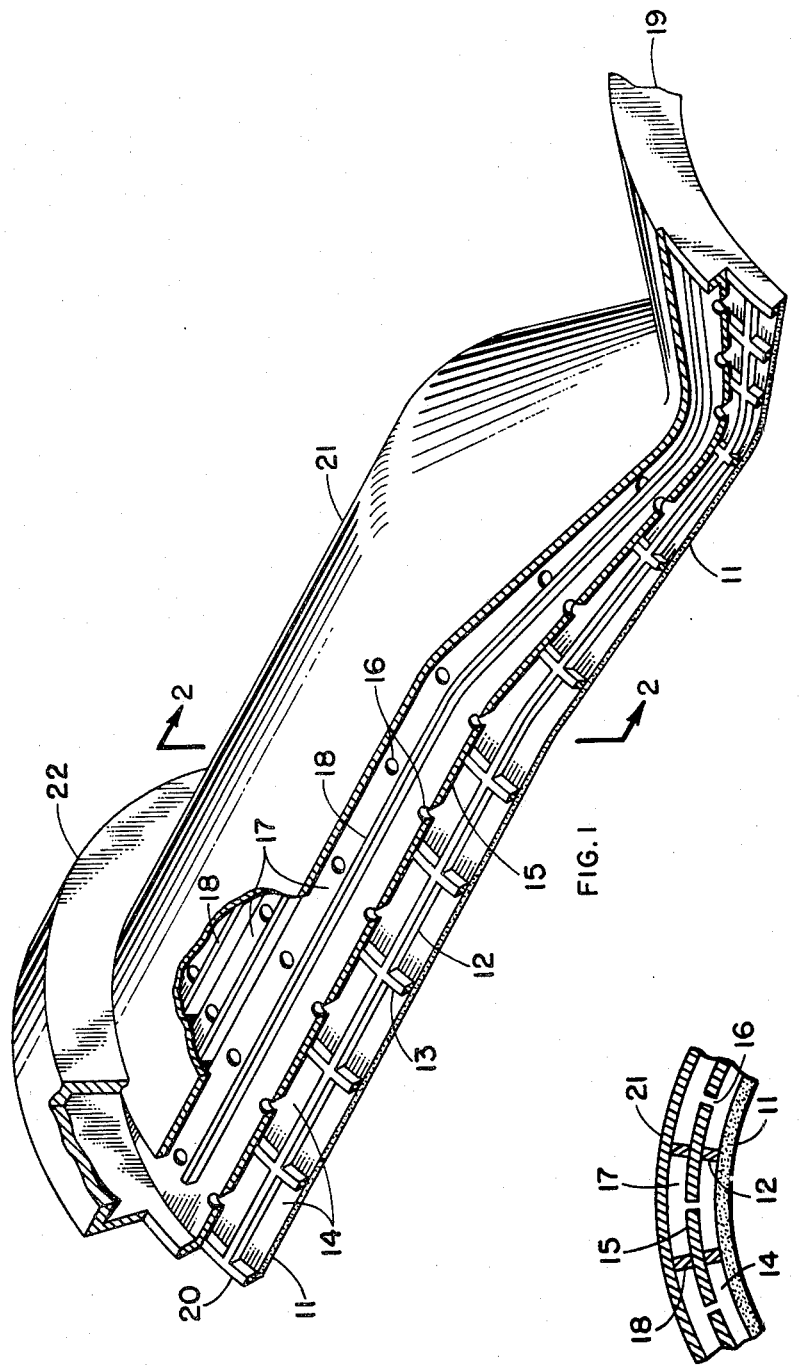

ROCKET CHAMBER AND METHOD OF MAKING

ORIGIN OF THE INVENTION

This invention was made by an employee of the United States Government and may be manufactured and used by or for the Government for governmental purposes without the payment of any royalties thereon or therefor.

This is a division of application Ser. No. 289,050 filed Sept. 14, 1972, now U.S. Pat. No. 3,832,920.

BACKGROUND OF THE INVENTION

The invention relates to transpirationally cooled rocket chambers and is directed more particularly to an improved rocket chamber and a method for making such a rocket chamber.

A transpirationally cooled rocket chamber is one in which the inner wall may be either a porous material such as a ceramic or metal or a wall having numerous apertures no larger than about 250 microns each in size. The pores of apertures of these walls allow passage of a transpirant thereby cooling the wall as it exits toward the combustion side and thus protecting the porous wall from destruction. To distribute the coolant over the porous wall distribution channels and manifolds must be provided.

In the past, transpirationally cooled rocket chambers have been assembled by stacking grooved plates. Such an arrangement is difficult to assemble, is very costly, and is excessive in weight, particularly in situations such as a space vehicle where weight is a critical factor. Additionally, in the past, the coolant or transpirant liquid supply channels were attached to the porous inner wall by means of brazing, welding or diffusion bonding. All these methods result in blocking substantial areas of the porous walls as well as causing distortions in the rocket chamber which undesirably effect the relatively precise dimensions and positioning required for the structural components which control the transpirant flow.

Attempts have also been made to fabricate transpirationally cooled rocket chambers from elongated staves similar to the way a wooden barrel is assembled. Each stave comprised a porous inner wall and the necessary passageways and outer walls. The staves were then assembled to form an annular rocket chamber. Then the staves were welded, brazed or diffusion bonded together. This method again resulted in excessive blockage of the porous wall whereby passage of the transpirant was substantially reduced so that adequate cooling of the inner rocket chamber wall was not provided.

OBJECTS AND SUMMARY OF THE INVENTION

It is an object of the invention to provide a transpirationally cooled rocket chamber which is relatively lightweight and inexpensive to construct.

It is another object of the invention to provide a rocket chamber wherein the permeability of an inner porous wall is continuous and varies in a predetermined manner even in areas where components are bonded to the porous wall.

Still another object of the invention is to provide a rocket engine construction method which is simple and easy to perform and which provides for accurate positioning and configuration of the various components making up the rocket chamber.

It is yet another object of the invention to provide a rocket engine construction method wherein no welding, brazing or the like is required thus avoiding damage and blockage to an inner porous wall.

A further object of the invention is to provide a rocket engine construction method which can be accomplished without distorting the components making up the rocket engine.

In summary, it is an object of the invention to provide a transpirationally cooled rocket engine requiring no welding, diffusion bonding, or brazing by starting with a precisely shaped porous wall with fixed permeability and then electroforming the required components.

BRIEF DESCRIPTION OF THE DRAWINGS

FIG. 1 is a pictorial oblique view, partially cut away, of a longitudinal section of an annular rocket chamber embodying the invention.

FIG. 2 is a partial traverse section taken along the line 2—2 of FIG. 1.

DESCRIPTION OF THE PREFERRED EMBODIMENT

Referring to FIG. 1 there is shown a partially cut away oblique view of a portion of a rocket chamber embodying the invention. The rocket chamber has a porous inner wall 11 having the desired shape, permeability and configuration of a rocket chamber. The wall 11 may be made by wrapping or weaving a fine wire cloth or matrix on a suitably shaped mandrel. The wire cloth may be made of stainless steel, copper or bronze wires although other wire materials may be used depending upon the temperature range of operation of the rocket chamber. After the wire cloth is positioned on the mandrel, it is sintered to provide a tenacious bond at any point where one wire contacts another.

The inner wall 11 may also use other kinds of porous media made of stainless-steel, copper or bronze formed and sintered over a suitable mandrel. For example, pads of metal wool (similar to steel wool) may be arranged on the mandrel and then sintered. Another alternative is to use a solid metal which may be made porous by acid etch techniques or using a laser beam.

The inner wall 11 is coated with a soluble material such as wax or plastic. By soluble materials is meant ones that may be easily removed from passageways, openings and the like. Wax, for example, may be removed by heat or the passage of hot liquid while plastic may be disolved by acetone. Longitudinal and annular grooves are then cut in the wax corresponding in pattern to the longitudinal and annular ribs 12 and 13. These grooves are then filled with metal by electroforming techniques which are known to those skilled in the art to form the longitudinal and annular ribs 12 and 13 which are tenaciously bonded to the porous wall 11. The spacing between any adjacent pair of annular ribs 13 and longitudinal ribs 12 forms distribution cavities 14 which receive a coolant from passages as will be described presently and which is to be expelled through the porous wall 11 to effect cooling the porous wall 11.

To form an inter chamber wall 15, the ribs 12, 13 are smoothed by machining or the like and then cleaned. The inter chamber wall 15 is then electroformed over the ribs and makes a tenacious bond at all points of contact with the ribs.

To the end that coolant pressure in each of the distribution cavities 14 will be substantially distributed as required for cooling the porous wall 11, metering holes 16 are drilled in the inter chamber wall 15. In lieu of drilling, suitable soluble rods may be disposed in a radial relation to the rocket chamber in each of the distribution cavities 14.

Distribution manifolds 17 are established by longitudinal ribs 18 which extend along the rocket chamber between rows of metering holes 16 to the exhaust nozzle end of the rocket chamber which is closed by a wall 19 which is also electroformed. The ribs 18 do not extend all the way to the front end 20 of the rocket chamber to provide for entrance of cooling fluid as will be described presently.

The ribs 18 are tenaciously bonded to the inter chamber wall 15 by electrodepositing metal in grooves which have been cut in a wax or plastic layer deposited over the inter chamber wall 15. The ribs 18 are then machined smooth and cleaned. An outer jacket 21 is then electroformed over the ribs 18 and bonded to them. Finally, an annular distribution channel 22 is attached to the front end 20 of the rocket chamber, the manifold 22 having walls which may be welded to the jacket 21 or the front end of the chamber 20.

The distribution manifold 22 and the front end 20 may also be electroformed in place, as shown in FIG. 1, to avoid welding.

After the rocket chamber is completed, the soluble material is removed from the interior passageways, channels and orifices by either heat, hot liquid, acetone or the like, depending on what soluble material was used.

FIG. 2 is a traverse section of a portion of the rocket chamber embodying the invention as shown in FIG. 1 and like parts are identified by like numerals. Shown in FIG. 2 are the porous wall 11, the longitudinal ribs 12, the inter chamber wall 15, the distribution manifold 17, the longitudinal ribs 18, the jacket 21, and the distribution cavities 14.

The permeability or ability of the porous wall to pass transpirant is not blocked or reduced by the ribs bonded thereto. From FIG. 2, it will be seen that, because of the thickness of porous wall 11, transpirant will flow laterally around the ribs and through the areas directly under the ribs.

It will be understood that some areas of the rocket chamber, the throat for example, will require more cooling than other areas. The desired transpirant flow is obtained by providing areas of different porosity and permeability for the wall 11 and/or by using metering holes of different size at various points in said inter chamber wall 15. Thus in the throat area of the rocket more transpirant flow may be obtained by providing increased porosity in the wall 11 and/or by increasing the metering hole size.

It will be understood that changes and modifications may be made to the foregoing invention without departing from the spirit and scope as set forth in the claims appended hereto.

What is claimed is:

1. A rocket chamber comprising:
   an inner annular wall of porous material, wherein said inner annular wall is tightly woven wire bonded at points of contact, said wire being selected from the group of metals consisting of stainless steel, bronze and copper;
   a network of annular and longitudinal ribs disposed outwardly of said wall and bonded thereto;
   an interchamber wall disposed outwardly of said ribs and bonded thereto to form distribution cavities, at least one metering orifice being located in said interchamber wall at every distribution cavity,
   a plurality of parallel longitudinal ribs disposed outwardly of said inter chamber wall and bonded thereto;
   an outer annular jacket bonded to said longitudinal ribs and defining with said longitudinal ribs and said inter chamber wall a plurality of distribution manifolds; and
   a feed manifold bonded to the front of said rocket chamber and communicating with said distribution manifolds.

* * * * *